(12) United States Patent
Jansen

(10) Patent No.: US 6,783,108 B2
(45) Date of Patent: Aug. 31, 2004

(54) FUELDRAULIC PINTLE VALVE

(75) Inventor: Harvey B. Jansen, Mesa, AZ (US)

(73) Assignee: Jansen's Aircraft Systems Controls, Inc., Tempe, AZ (US)

(*) Notice: Subject to any disclaimer, the term of this patent is extended or adjusted under 35 U.S.C. 154(b) by 166 days.

(21) Appl. No.: 10/219,622

(22) Filed: Aug. 15, 2002

(65) Prior Publication Data

US 2003/0052289 A1 Mar. 20, 2003

Related U.S. Application Data

(60) Provisional application No. 60/313,179, filed on Aug. 17, 2001.

(51) Int. Cl.$^7$ .................. F16K 31/143; F16K 47/00
(52) U.S. Cl. .................................. 251/63.5; 251/127
(58) Field of Search .................. 251/129.15, 129.18, 251/335.1, 366, 367, 904, 63.5, 126, 127, 903, 62

(56) References Cited

U.S. PATENT DOCUMENTS

| | | | |
|---|---|---|---|
| 3,499,456 A | | 3/1970 | Rerecich et al. |
| 4,265,272 A | * | 5/1981 | Klimowicz et al. .... 137/625.62 |
| 4,461,450 A | | 7/1984 | Soland et al. |
| 4,694,730 A | * | 9/1987 | Krieger et al. ......... 91/170 MP |
| 4,774,980 A | | 10/1988 | Etheridge |
| 5,158,261 A | * | 10/1992 | Morohoshi ............. 251/129.15 |
| 5,368,273 A | | 11/1994 | Dante |
| 5,452,747 A | * | 9/1995 | De Man .................... 137/885 |
| 5,878,992 A | | 3/1999 | Edwards et al. |
| 5,967,164 A | | 10/1999 | Denda et al. |
| 6,158,714 A | | 12/2000 | Lembcke et al. |
| 6,250,602 B1 | | 6/2001 | Jansen |
| 6,257,837 B1 | * | 7/2001 | Adams et al. .............. 417/228 |
| 6,460,561 B1 | * | 10/2002 | Ebinger ..................... 137/331 |
| 6,565,063 B1 | * | 5/2003 | Newton et al. ............. 251/126 |

* cited by examiner

Primary Examiner—D. Neal Muir
(74) Attorney, Agent, or Firm—Quarles & Brady LLP

(57) ABSTRACT

A fueldraulic metering valve uses pressurized liquid fuel to control flow of gaseous fuel to a jet engine combustion chamber. The valve has a disconnectable body defining a piston chamber and a cavity for an interchangeable venturi nozzle module, both disposed about a stroke axis. A servo valve controls flow of the liquid fuel through the piston chamber and supply and return ports. The liquid fuel drives a piston and pintle assembly to open and close off the throat of the venturi passageway, and thereby control metering of the gaseous fuel, which flow through separate intake and exhaust ports. The gas and liquid fuel are separated by a high temperature seal. The liquid fuel is routed through the piston and a special baffle to dissipate heat transferred to the seal and piston from the hot gaseous fuel. A LVDT position transducer provides feedback to the controller for correcting position error.

24 Claims, 10 Drawing Sheets

FUELDRAULIC PINTLE VALVE

CROSS-REFERENCE TO RELATED APPLICATION

This application claims benefit to U.S. provisional application Ser. No. 60/313,179, filed Aug. 17, 2001.

STATEMENT OF FEDERALLY SPONSORED RESEARCH OR DEVELOPMENT

This invention was developed with Federal Government support under Contract No. F33615-96-C-2694 awarded by the United States Air Force. The Federal Government thereby has certain rights to this invention.

BACKGROUND OF THE INVENTION

1. Technical Field

The present invention relates to metering valves, and in particular, to pintle valves, such as can be used to meter fuel in air and space vehicles.

2. Description of the Related Art

Valves for metering fuel and other combustible media to engines in aircraft and spacecraft are well known in the art, see e.g., U.S. Pat. No. 6,250,602 B1, assigned to the assignee of the present invention. Such valves are used to control the rate at which pressurized fuel, in a liquid or gaseous state, is supplied to inlet orifices in the engine combustion chambers. The valves are relied upon to provide consistent and rapid control of flow rates of fuel at ignition and during sustained operation. Their operation is critical to proper performance of the vehicle. Poor valve operation can result in unintended engine shutdown and failure.

These valves can have movable stem-like valve members, or pintles, aligned with the outlet port of the valve for controlling the rate at which fuel flows to the engine. Pintle type valves are typically less affected by the temperatures and pressures of the fuel passing through the fuel chamber of the valve, due to their contoured head and axial movement. However, even pintle valves can be adversely affected by the high pressure and temperature conditions of jet engines.

Jet engines often burn fuel in a gaseous state at elevated temperatures. The high temperature environment can cause thermal breakdown of the metering components of the valves, which can lead to improper performance or failure unless they are cooled adequately. One technique for cooling the valves is to circulate a pressurized liquid through the valves in a separate area from the gas that is relatively cool in comparison to the hot gas. The pressurized liquid not only cools the valve but also drives the metering components of the valve. To minimize weight in air and space vehicles, the liquid used to cool and drive the valves can be the pre-burned fuel in a liquid state. Such valves are known in the industry as "fueldraulic" valves.

Conventional fueldraulic valves typically do not provide adequate cooling for use with supersonic combustion ramjet ("scramjet") engines, which fly between Mach 4 and Mach 10 in the earth's atmosphere. Known scramjet engines can burn gaseous hydrogen-based fuel at temperatures in excess of 1000° F. and encounter considerable external heating from the extreme environment. Typical conventional fueldraulic valves are thus unsuitable for the aggravated thermal conditions of scramjet engines.

SUMMARY OF THE INVENTION

The present invention provides an improved pintle valve particularly designed to meter high temperature media, such as gaseous jet fuel. The motive force operating the pintle which controls passage through a nozzle can be a pressurized liquid, such as liquid jet fuel. The pressurized liquid is uniquely routed through a piston chamber to cool the piston and associated components as it drives the pintle.

Specifically, the invention provides a valve actuated by a pressurized drive media to meter a primary media. A body defines a piston chamber and has a nozzle passageway axially aligned with the piston chamber about a stroke axis. The body also has drive media supply and return ports in communication with the piston chamber and primary media intake and exhaust ports in communication with the nozzle passageway. The piston chamber and supply and return ports are isolated from the nozzle passageway and intake and exhaust ports. A pintle extends along the stroke axis and has a head sized to close off the nozzle passageway. A piston is disposed in the piston chamber along the stroke axis. A baffle directs the drive media along an axial path adjacent the piston. The piston is coupled to the pintle and has a head responsive to the drive media when pressurized to drive the pintle between an open position in which the primary media intake and exhaust ports are in communication with each other and an extended position in which the pintle head closes off the nozzle passageway such that the intake and exhaust ports are not in communication with each other.

In one preferred form, the invention provides a pressurized liquid fuel driven valve for metering gaseous fuel to a jet engine of an air or space vehicle. A valve body has a main housing at least in part defining a piston chamber disposed about a stroke axis and the supply and return ports for the pressurized liquid fuel. A nozzle body extends from the main housing along the stroke axis in axial alignment with the piston chamber and having the intake and exhaust ports for passing the gaseous fuel through the throat of a venturi passageway. A seal separates the piston chamber and the supply and return ports from the venturi passageway and the intake and exhaust ports. A pintle extends along the stroke axis concentric with the venturi passageway and has a head sized to close off the throat of the venturi passageway. A piston coupled to the pintle extends from the piston chamber along the stroke axis and has a head responsive to the pressurized liquid fuel to drive the pintle along the stroke axis between the open and closed positions. A servo valve, in communication with the supply and return ports, controls flow of the pressurized liquid fuel through the piston chamber and thereby controls translation direction and speed of the piston.

The valve can thus be used to meter fuel to the combustion chambers of jet engines. The primary media is a gaseous jet fuel and the drive media is liquid jet fuel. The gaseous jet fuel is at a much higher temperature, preferably at least twice that of the liquid jet fuel. For example, the valve has been tested for successful operation for liquid jet fuel at approximately 300° F. and gaseous jet fuel at approximately 1350° F. The valve has also been tested for successful operation when both fuels are liquid and has the design capability of operation at low temperatures of at least −65° F.

In another preferred form, the piston has a hollow core and opens at a head opposite the end to which the pintle is threaded. The piston has a radial passageway leading to this axial cavity so that drive media can pass through the piston. The baffle has a hollow core and is disposed in the piston cavity. The baffle is open at both end and has an externally threaded section contacting the piston cavity wall and thereby defining two helical flow paths. The piston rides in a piston guide fixedly disposed about the stroke axis within the piston chamber. The piston guide has an inner diameter against which a piston head slideably seals and an outer annular channel sealed against the piston chamber at one axial end and defining a passageway at a downstream axial end. A high temperature seal is disposed about the piston beyond the downstream end of the piston guide separating the drive media from the primary media.

This arrangement directs the drive media from the supply port to the annular channel around the piston guide and across the face of the seal, through the passageway in the piston, between the piston and the baffle, through the dual thread paths, back through the interior of the baffle and out the opening at the piston head. This arrangement facilitates the metering of very hot gaseous fuel as required for some jet engines, scramjet engines. The relatively cool liquid fuel circulates round the piston guide, through the outer and inner diameter of piston body and around the face of the primary seal isolating the liquid fuel from the gaseous fuel. The piston guide is purposely placed upstream from the main seal to reduce thermal distortion (and thus binding) between the guide and piston that could otherwise occur as a result of the large temperature gradient between the gas and liquid areas of the valve. The dual threads create ideal flow paths for proper heat transfer from the piston.

In another preferred embodiment, an electronic control unit provides an input signal to a servo valve for controlling flow of the drive media through the valve and the supply and return ports. A position transducer, preferably a linear variable differential transformer, is disposed along the stroke axis in the center of the baffle. The position transducer has a sensing coil (not shown) fixed with respect to the body and a metallic probe coupled to the piston and movable within the center of the coil. The position transducer provides a feedback signal to the control unit corresponding to the position of the piston (and thus the position of the pintle with respect to the nozzle passageway). The control unit can adjust the input signal supplied to the servo valve in response to the feedback signal.

The present invention thus provides a highly accurate metering valve in which deviations in the actual position of the pintle (and thereby flow rate of the gaseous fuel through the nozzle) are corrected electronically to match the input signal to the valve. This closed-loop position-feedback control also improves the dynamic response of the valve.

In yet another preferred form, the nozzle passageway is a venturi passageway having a narrowed throat that can be sealed by the pintle head. The venturi passageway provides sonic velocity flow through the throat to reduce noise without high pressure losses in the nozzle.

In still another preferred form, the valve body is defined by a main housing and a removable nozzle body secured to the main housing by a threaded collar. The venturi passageway is defined by a removable nozzle module. The nozzle module can be interchanged with others of different configurations or throat sizes and the pintle can be interchanged with others of different size or configuration, access thereto be gained by removing the nozzle body. Thus, the valve is highly customizable for varying the flow and metering characteristics of the valve.

The valve body can also be a suitable manifold for a multi-valve array designed to meter fuel to the injectors of each combustion zone in a jet engine. In one preferred form, the body defines five sets of piston chambers with the drive liquid passing in parallel through each chamber after entering the supply port of one chamber and being routed to the next chamber through a parallel outlet port of the first chamber and subsequent chambers.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENTS

Figure 1:
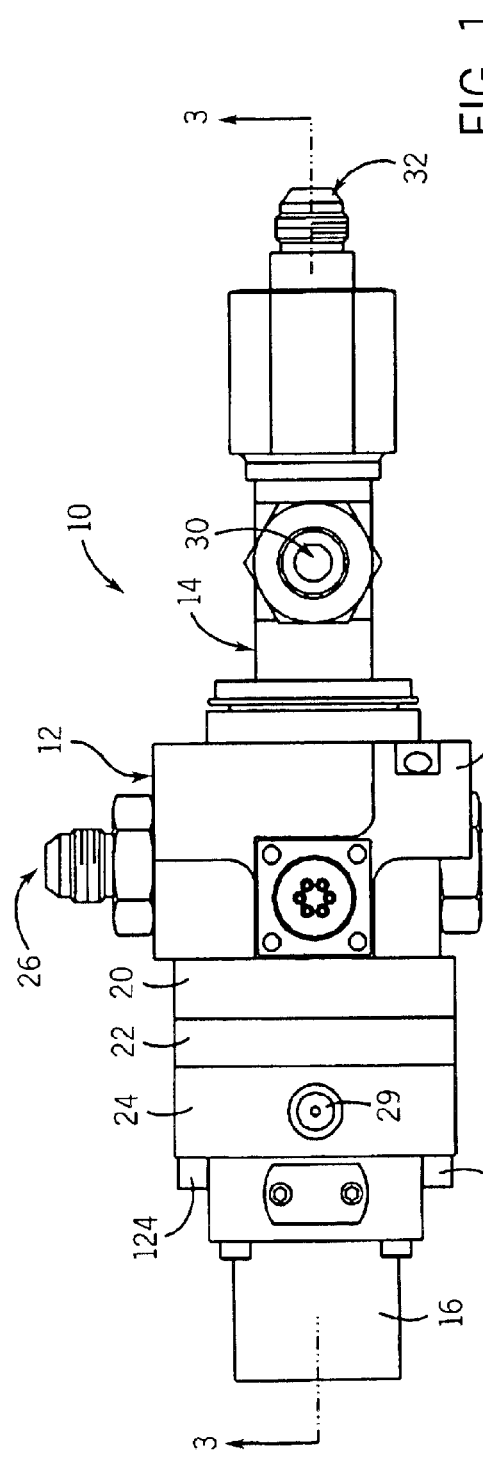
FIG. 1 is a top plan view of a fueldraulic metering valve according to the present invention.
Figure 2:
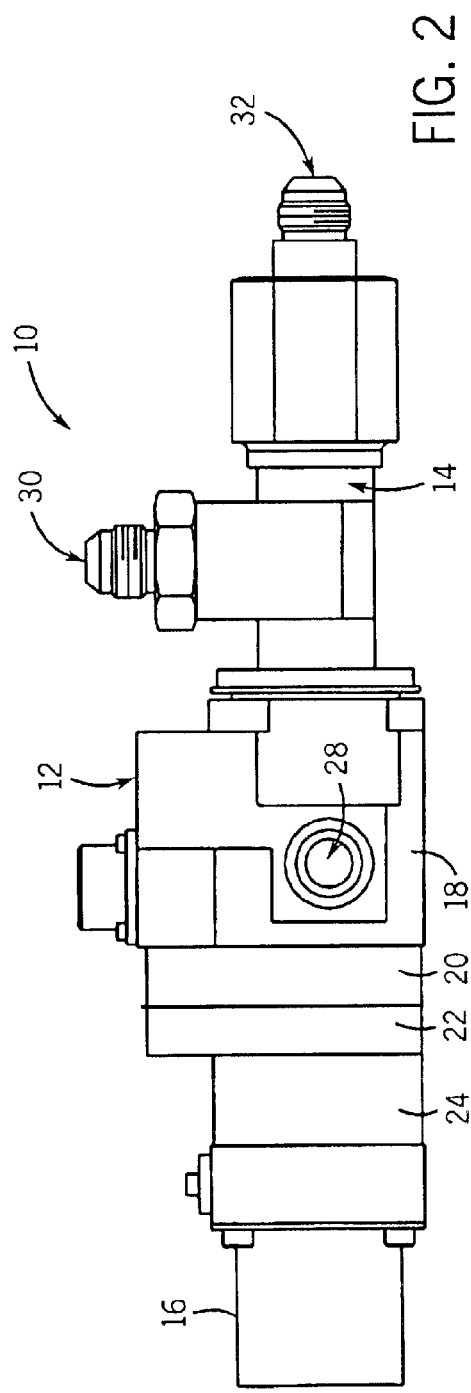
FIG. 2 is a side elevational view of the valve of FIG. 1.

Referring to FIGS. 1 and 2, the present invention provides a metering valve 10 having a valve body 12 to one end of which is connected a nozzle body 14 and to the other end is mounted a servo valve 16. The valve body 12 is composed of a main housing 18, a mounting plate 20, a spacer 22, a control block 24. The main housing 18 of the valve body 12 defines a supply port 26 for pressurized drive media and a return port 28 for returning the drive media to a supply tank (not shown). The control block 24 defines a control port 29 in communication with an internal control passage (see 126 in FIG. 3). The nozzle body 14 includes an intake port 30 and an exhaust port 32 for metering the primary media. These ports are shown with suitable fittings for suitable interface with transport lines.

The drive media can be any suitable fluid brought into the valve body under pressure. The primary media can be any suitable liquid or gaseous media. When the valve is to be used with scramjet engines, it is preferably a "fueldraulic" valve in which the drive media is fuel, such as a hydrogen-based liquid jet fuel. The primary media is then a gaseous hydrogen (with silane at ignition). JP-7, available from refining hydrocarbon based liquid, is an example of one common jet fuel formula naturally available as a liquid and can be transformed into a gaseous state suitable for use with the present valve in a scramjet application. During operation of the scramjet, the pressure at the supply port is approximately 1000 psia and 15 psia at the return port and approximately 800 psia at the intake port and 700 psia at the exhaust port. The maximum operating temperature of the liquid fuel is approximately 300° F. and the gaseous fuel is about 1350° F.

Figure 3:
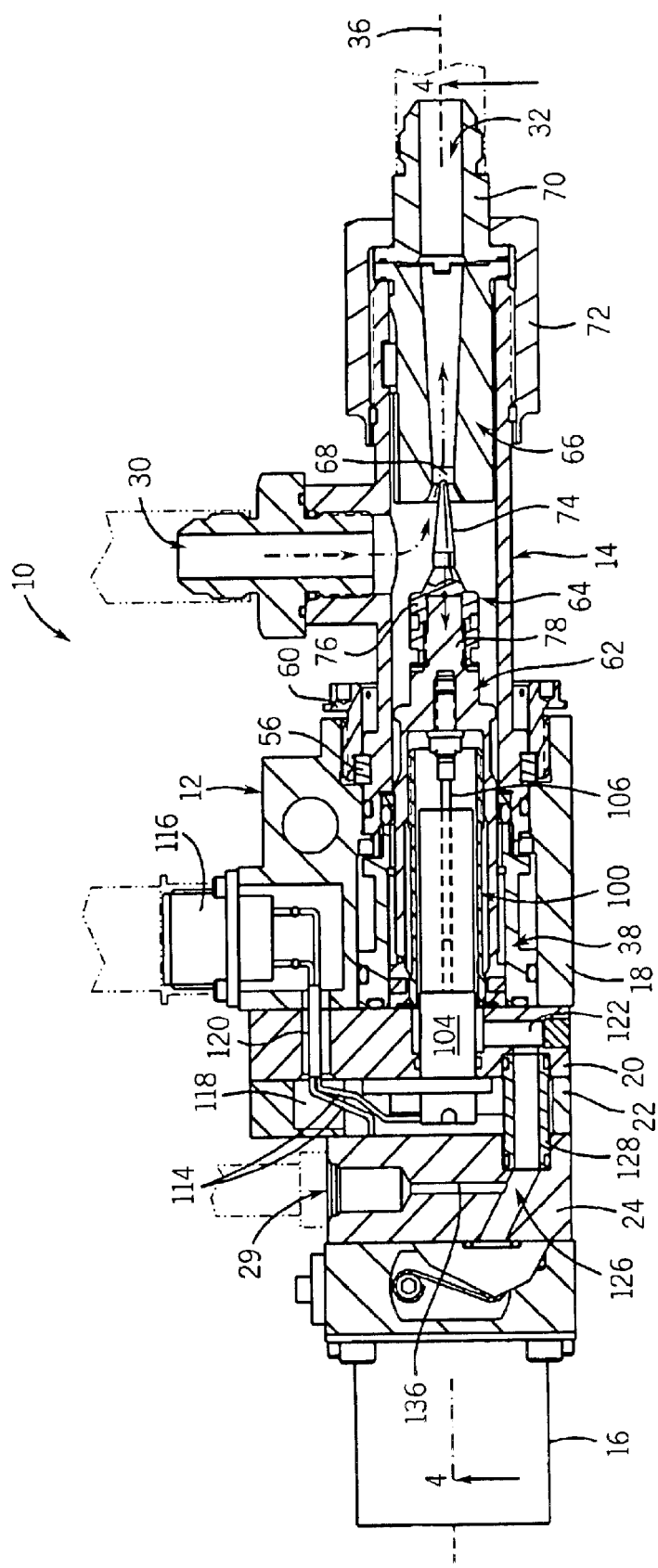
FIG. 3 is a side cross-sectional view taken along line 3—3 of FIG. 1 with a piston/pintle assembly in a fully open throttle position.
Figure 5:
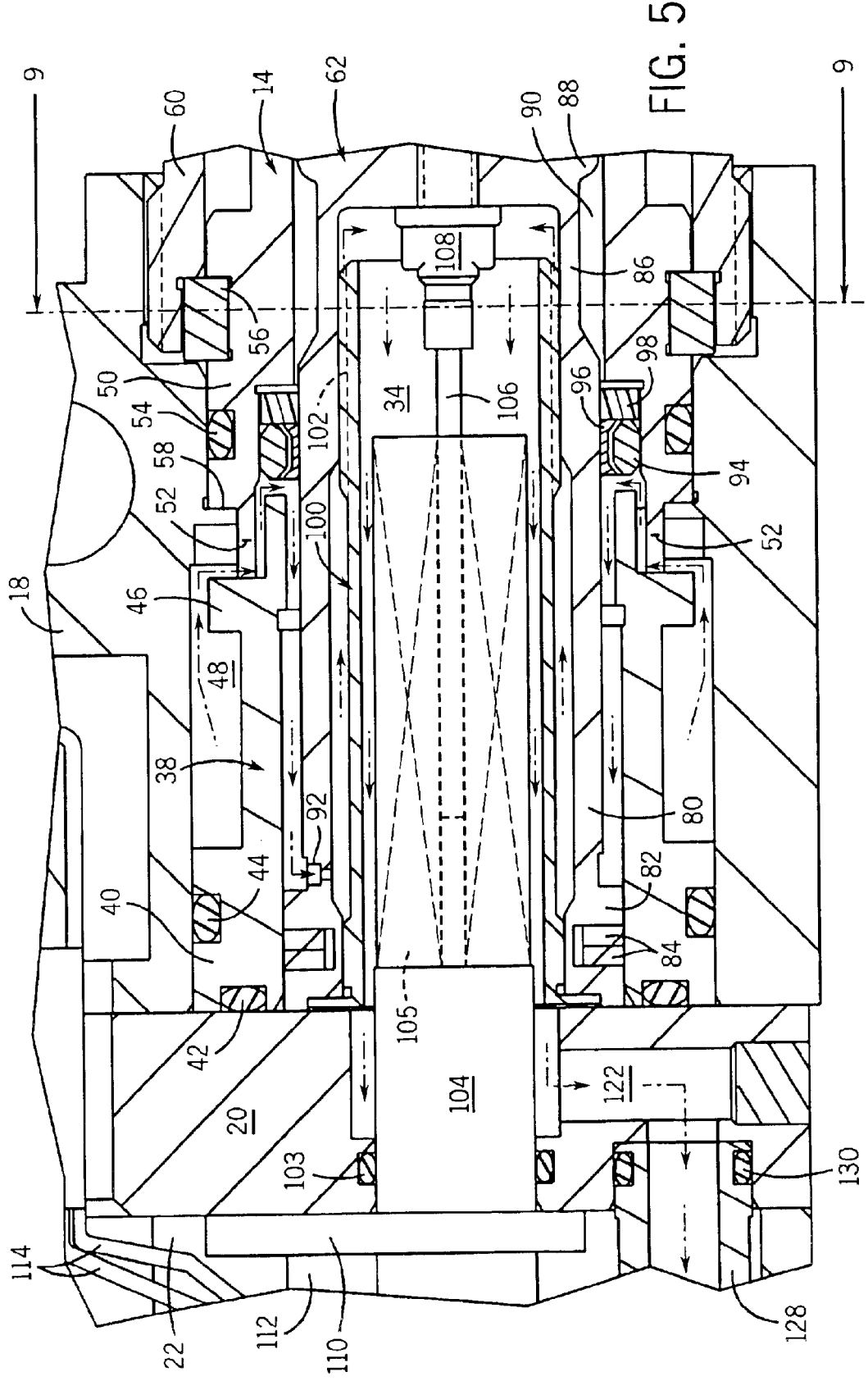
FIG. 5 is an enlarged cross-sectional view showing the fluid path through the piston chamber when the piston is moved to the fully open throttle position.
Figure 9:
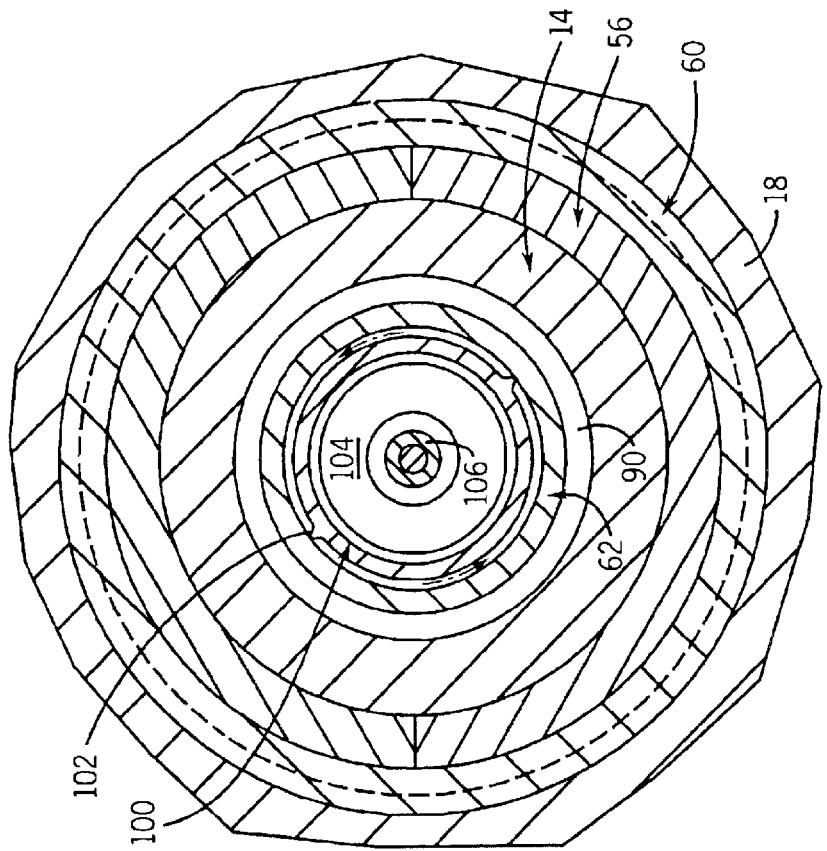
FIG. 9 is a cross-sectional view taken along line 9—9 of FIG. 5.

With reference to FIGS. 3, 5 and 9, the internal components of the valve will now be described. The main housing 18 defines (at least in part) an open-ended piston chamber 34 concentric about a piston axis 36. In the piston chamber 34 is an annular piston guide 38, preferably made of anodized aluminum, defining at its outer surface an increased diameter section 40 at one end. This end defines a circular face groove that holds an o-ring 42 which seals against the mounting plate 20 and a circumferential groove holding another o-ring 44 which seals against the wall of the piston chamber 34. The outer surface of the piston guide 38 also has an annular flange 46 near its opposite (inner) end so as to define an annular channel 48 around its periphery between the flange 46 and the sealed end 40 that is in communication with the supply port 26. The flanged end of the piston guide 38 abuts an inner end 50 of the nozzle body 14 having four anti-rotation lugs 52 (two shown) mating with slots in the main housing 18. The inner end 50 of the nozzle body 14 has two axially spaced circumferential grooves, the smaller groove holding another o-ring 54 and the larger groove holding a two-piece stainless steel split ring 56. The inner end 50 of the nozzle body 14 abuts a face wall 58 in the piston chamber 34 when the nozzle body 14 is secured to the main housing 18 by a threaded collar, preferably a spanner nut, 60. The spanner nut 60 has external threads that mate with internal threads of the main housing 18 and engages the split ring 56, which has a larger outer diameter than the inner diameter of the piston chamber 34, hold the nozzle body 14 in place.

Within the space defined by the interior of the piston guide 38 and the nozzle body 14 are the metering components of the valve, namely, a piston 62, a pintle 64 and a nozzle module 66, all preferably made of stainless steel. The nozzle module 66 defines a venturi passageway having the characteristic narrowed throat 68 and tapered inlet and outlet sections. As is understood in the art, the venturi passageway enables the gaseous fuel to reach sonic velocity at the throat 68, which prevents noise at the exhaust port from reaching the intake port with relatively small pressure loss between the intake and exhaust ports. The nozzle module 66 slides into the nozzle body 14 through the exhaust port 32 until its flanged end abuts the end of the nozzle body 14. The module 66 and the exhaust fitting 70 are held in place by a locking collar 72 that threads onto the outside of the nozzle body 14. The venturi passageway through the nozzle module 66 is closed by the pintle 64, which has an elongated conical head 74 contoured to fit within the throat 68 of the venturi passageway and to provide a surface seal with the tapered inlet section thereof. A base 76 of the pintle 64 has internal threads that thread directly onto a tail end 78 of the piston 62.

This arrangement thus makes it easy to change the size of the venturi passageway by simply removing the exhaust fitting collar and exchanging nozzle modules, and if necessary, by disconnecting the nozzle body from the main housing and exchanging the pintle. Even if the nozzle module was not a separate insert, the flow characteristics of the valve could be changed by swapping entire nozzle bodies (and exchanging pintles, if necessary). The nozzle module could also be exchanged with a nozzle defining a different type of passageway (for example a Laval type passageway) depending upon the application.

The piston 62 is defined by the tail end 78 and an open-ended annular shaft 80 extending to a piston head 82 of increased diameter having a circumferential groove for two Teflon® piston rings 84 which seal against the inner diameter of the piston guide 38. The piston 62 has a thinned wall section 86 adjacent a widened section 88 near the tail end of the piston creating an annular pocket 90 (open at its upstream side) between the piston 62 and the inner diameter of the nozzle body 14. The shaft 80 flares outward slightly from the thinned wall section 86 but remains spaced radially from the piston guide 38. The flared section has a radial opening 92 extending through the shaft wall. The piston shaft is sealed against an inner diameter of the inner end of the nozzle body 14 by a two-part shaft seal including a special hex-shaped high temperature rubber seal 94 wrapped about a Teflon® cap strip 96. Another high temperature plastic washer 98 mounts about the shaft downstream from this seal, which together with the washer 98, physically separates the drive media from the primary media. In the case of the scramjet application, this shaft seal and washer separates the liquid fuel from the extremely hot gaseous fuel. This seal arrangement has very low (near zero) leakage.

Figure 10:
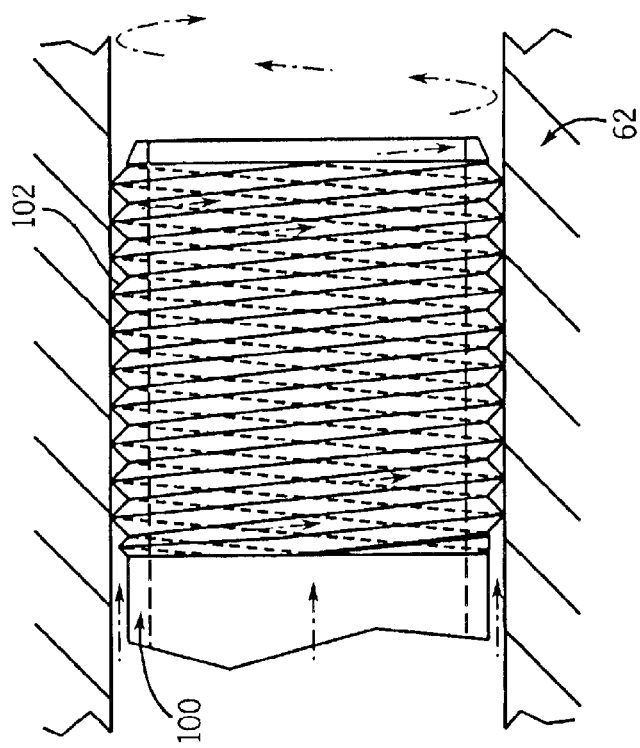
FIG. 10 shows the double threaded end of a fluid baffle providing two fluid flow paths.

Within the cavity defined by the piston 62 is a tubular fluid baffle 100, preferably made of stainless steel. The body of the baffle 100 is spaced radially from the inner diameter of the piston 62. The baffle 100 has a flanged end that fits into a circular recess in the piston head and a double threaded end 102 that is press fit into the interior of the piston 62 near the tail end. The baffle 100 is thus anchored to the piston 62 and travels with the piston during operation of the valve. Referring to FIG. 10, the double threaded end 102 of the baffle 100 and the inner diameter of the piston 62 define two helical (spiral) flow pathways, 180 degrees out of phase, leading from the annular space between the baffle 100 and the piston 62 to axially past the end of the baffle 100 and to its interior. Preferably, the threaded end of the baffle has 2-start, 8 pitch standard threads.

Within the baffle 100 is a position transducer, preferably a cylindrical linear variable differential transformer (LVDT) 104. The LVDT 104 is mounted axially within the center of the baffle 100 so as to be radially spaced therefrom. An o-ring 103 fit within a groove in the mounting plate 20 seals the periphery of the LVDT 104. The LVDT 104 includes a sensing coil 105 wound therewithin defining an axial passage for an elongated metallic probe 106 mounted to the piston 62 at a threaded end and secured by a retaining nut 108. The LVDT 104 is mounted at flange 110 to the mounting plate 20 by four bolts 112 threaded into openings in the main housing 18. By tightening the bolts for the LVDT 104 (and the spanner nut 60), the mounting plate 20 (and the inner end of the nozzle body 14) seals the piston chamber 34 and fixes the position of the piston guide 38. Conductors 114 run from the coil to an electrical junction 116 through passageways 118 and 120 in the spacer 22 and the mounting plate 20, respectively. The mounting plate 20 also defines a passageway 122 beginning around the LVDT 104 and running radially outward. Passageway 122 is in communication with the interior of the baffle 100 through its open end (around the LVDT 104).

Figure 4:
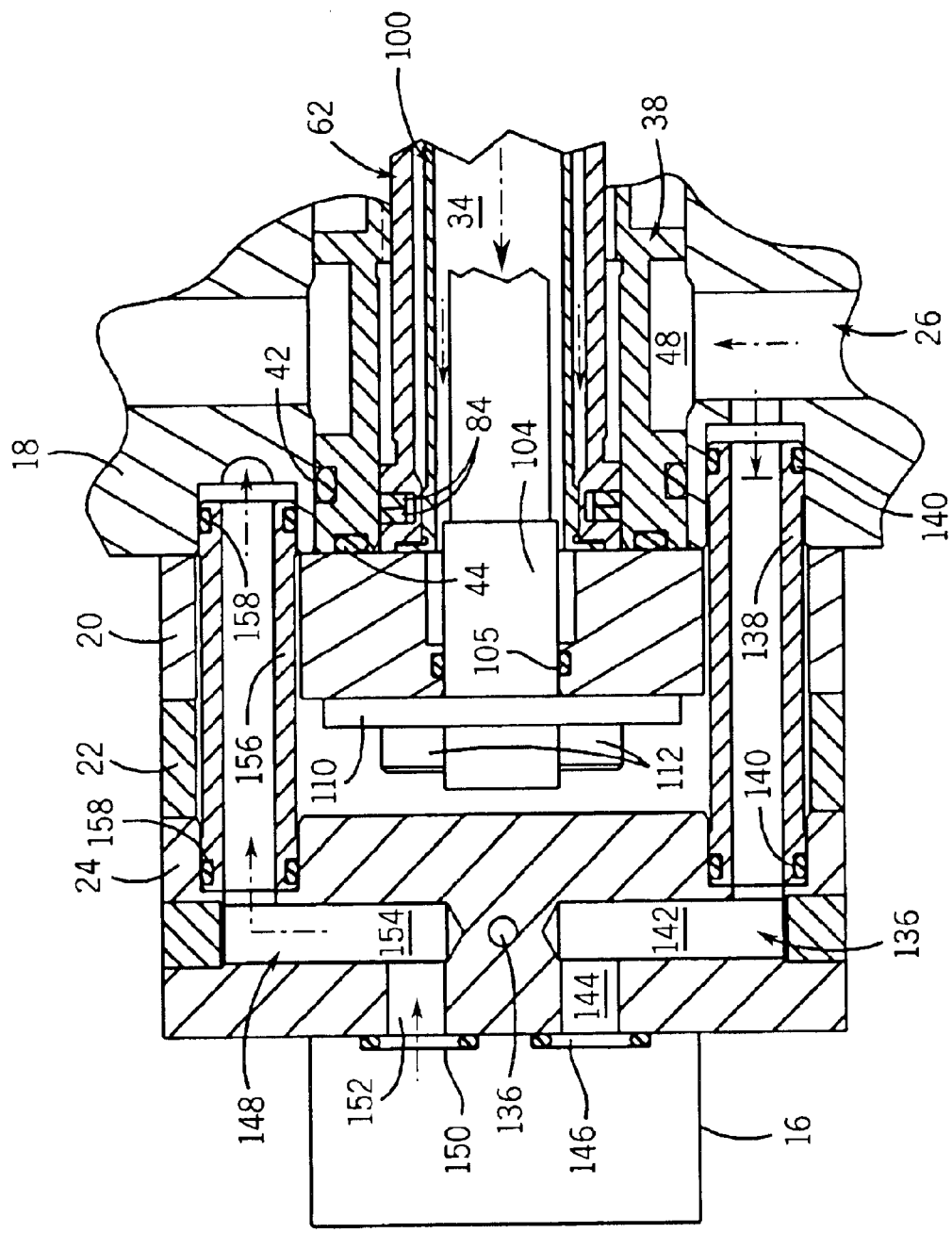
FIG. 4 is a partial cross-sectional view taken along line 4—4 of FIG. 3.

The mounting plate 20, spacer 22 and control block 24, which are bolted onto the main housing 18 by bolts 112 and 124 with suitable seals therebetween, define the remainder of the supply, return and control fluid passageways. As shown in FIG. 3, the control fluid routing 126 leads from passageway 122 through a metallic transfer tube 128, having grooves for o-rings 130 at each end, to a passageway 132 in the control block 24, which leads to a port 134 in the servo valve 16. This passageway is in communication with the control port 29 through bore 136. Referring to FIG. 4, the supply fluid routing 136 begins from the supply port 26 through another transfer tube 138 (with o-rings 140 at each end) leading to radial passageway 142 and axial passageway 144 to port 146 of the servo valve 16. Similarly, the return fluid routing 148 leads from port 150 of the servo valve 16 to passageways 152 and 154 to transfer tube 156 (with o-rings 158) to passageway 160 in the main housing 18 and back to the return port 28.

The servo valve 16 bolts to the control block 24 and can be any conventional servo valve capable of accurately controlling supply and return flow in response to command input signals with low hysteresis. A suitable servo valve is commercially available from the assignee of the present invention, Jansen's Aircraft Systems Controls, Inc. of Tempe, Ariz. As such, the servo valve will not be discussed in detail. Generally, however, the servo valve will include a sensing coil and an armature moved by magnetic force generated by the coil. In one form, the armature can be caused to pivot a clevis-shaped element about a flexural pivot to open and close the ports. Some cross-port leakage is acceptable.

Figure 11:
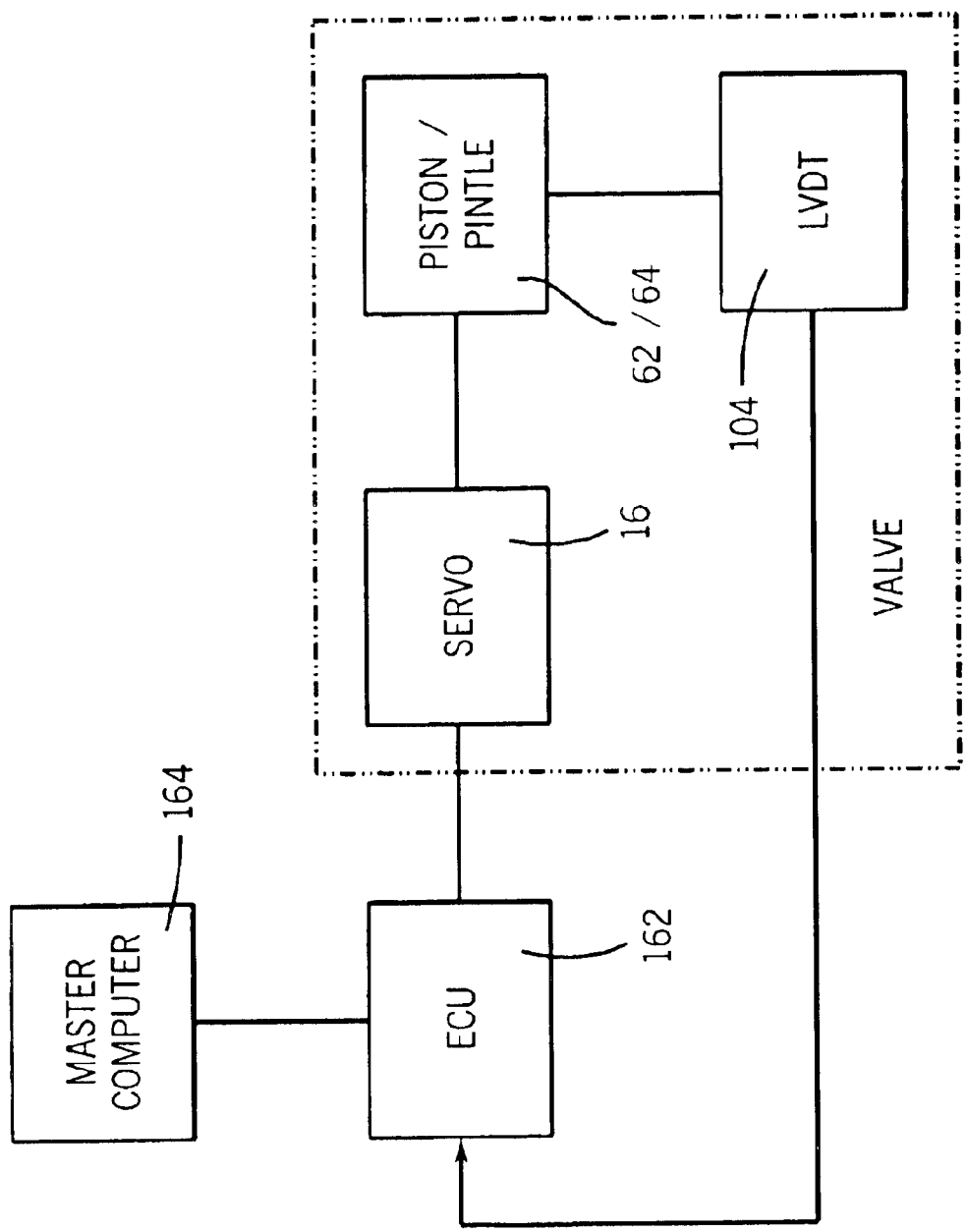
FIG. 11 is a block diagram of an exemplary valve control system.

Referring to FIG. 11, the servo valve 16 is electrically coupled to an electronic control unit 162. In the case of a jet or scramjet engine application, the control unit 162 will be an integral or discrete part of a vehicle system computer 164. The servo valve operates in response to input command signals from the electronic control unit 162 to control the flow of pressurized liquid (fuel) through the valve 10. According to the command input, the fuel will drive the piston (and thereby the pintle) axially back and forth to change the throttling of the nozzle and thus control the flow rate of the gas. The movement of the piston will cause the metallic probe to translate with respect to the LVDT coil and thus vary the electrical signal from the LVDT. This signal is fed back to the control unit, which executes position correcting signals to the servo valve if the actual position was different than that of the command input. This closed loop position feedback circuit thus improves the valve's metering accuracy. Moreover, although not shown in FIG. 11, a pressure gauge or other monitoring hardware can be coupled to the control port to monitor the pressure in the valve at the return side of the servo valve. This data is also used to control and verify the accuracy of the valve.

Figure 6:
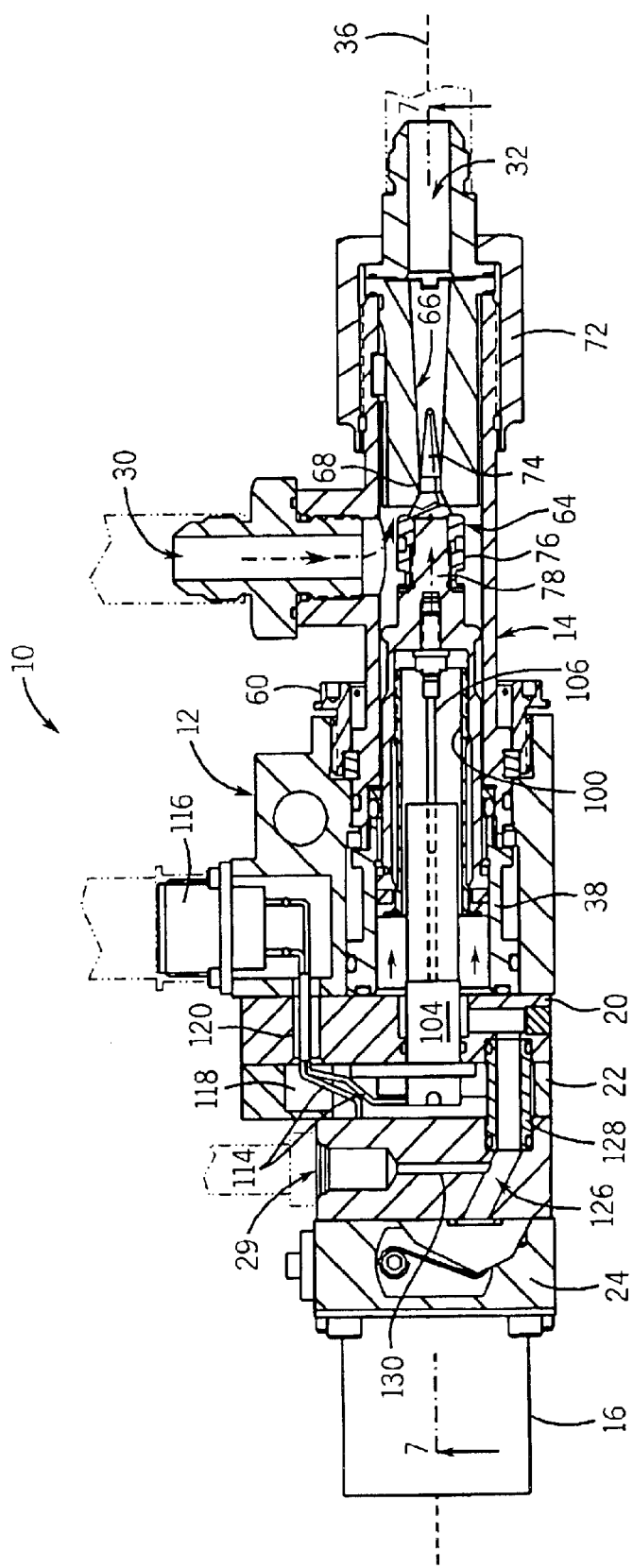
FIG. 6 is a side cross-sectional view taken along line 3—3 of FIG. 1 with a piston/pintle assembly in a closed throttle position.
Figure 7:
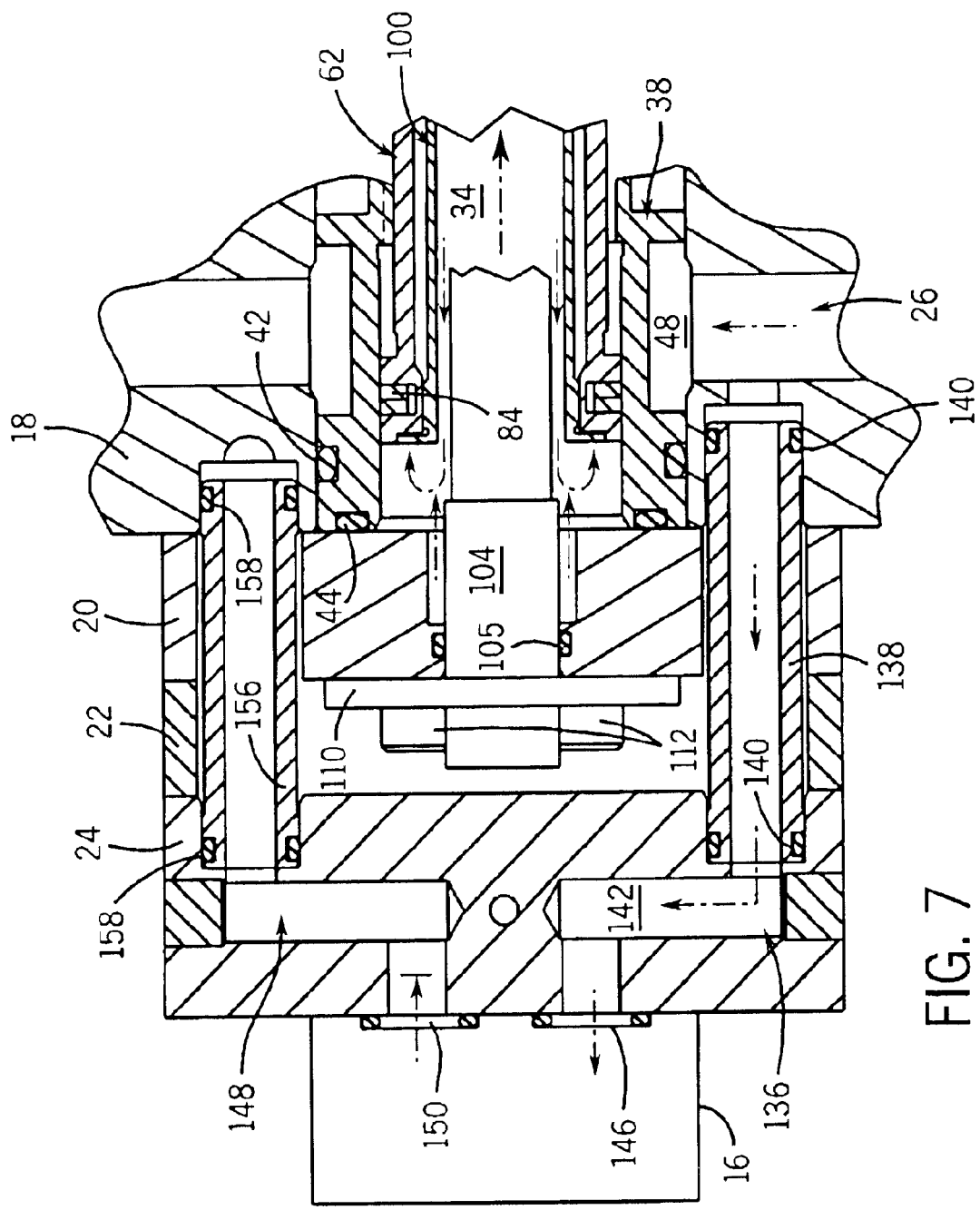
FIG. 7 is a partial cross-sectional view taken along line 7—7 of FIG. 6.
Figure 8:
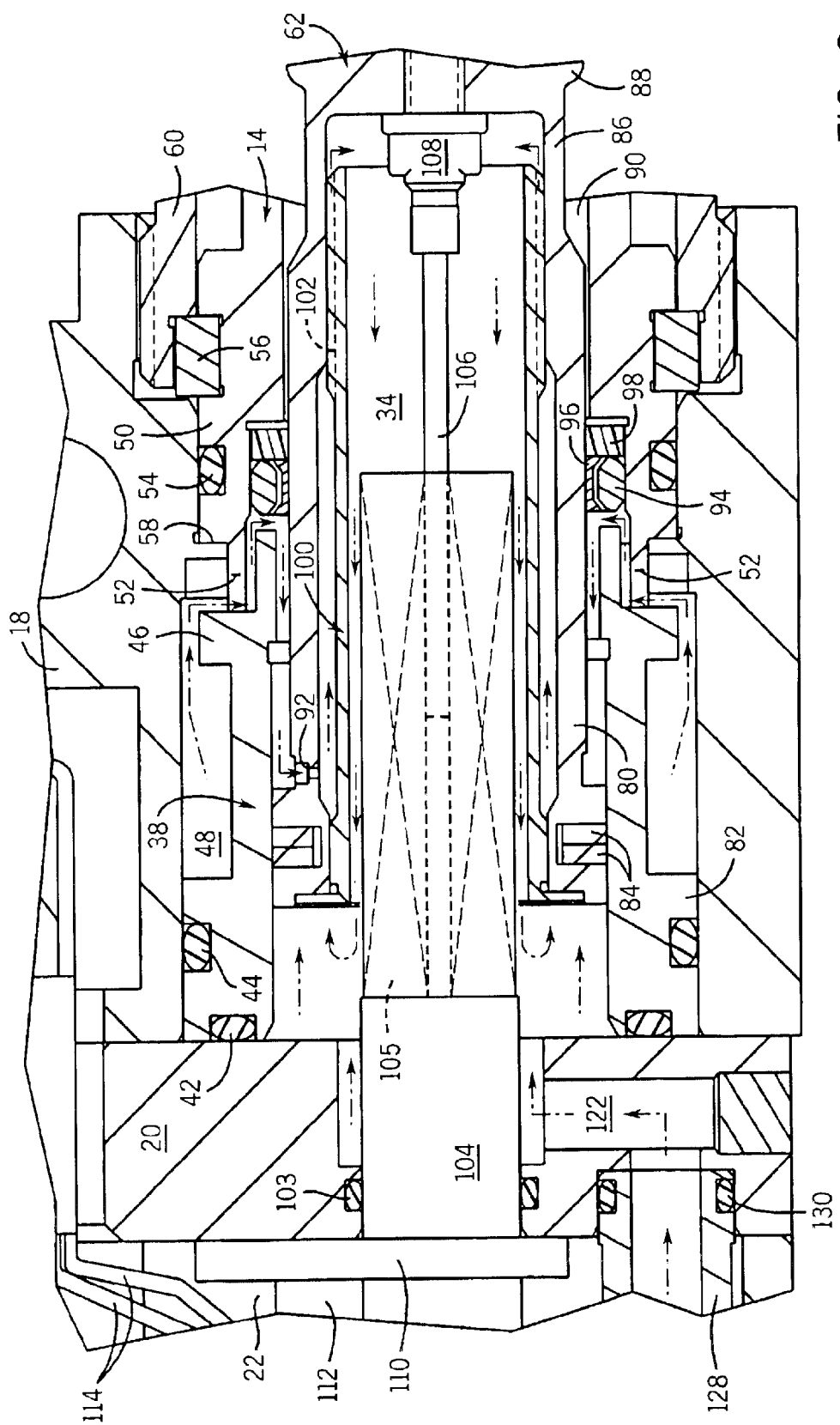
FIG. 8 is an enlarged cross-sectional view showing the fluid path through the piston chamber when the piston is moved to the closed throttle position.

FIGS. 3–5 show the valve when the drive fuel is being routed to drive the piston away from the nozzle to a fully open throttle condition. FIGS. 6–8 show the valve in a fully closed throttle condition preventing metering of the gas. In particular, the pressurized liquid is brought into the valve, for example from a supply tank through a supply line connected to the supply port fitting. Since the liquid is pressurized, it will initially enter the valve and pass into the annular channel 48 defined by the piston guide 38 and into the supply routing 136 to the servo valve 16.

When the nozzle is to be opened, the servo valve 16 closes its supply side port 146 and opens its return side port 150. The piston/pintle assembly is driven axially away from the nozzle (left in the drawings) by the pressurized fluid taking the path shown in FIGS. 4 and 5. Specifically, since port a 146 of the servo valve 16 is closed, the liquid in the supply routing 136 will block flow thereto and direct flow only into the piston chamber 34. Following the arrows of FIG. 5, the liquid flows from the annular channel 48 along the outside of the piston guide 38 to the cool side face of the shaft seal (items 94 and 96). The fluid flows across the face of the shaft seal and back through the small annular space between the piston 62 and the piston guide 38 where it applies a force on the back of the piston head 40 to translate the piston 62 (upstream) away from the nozzle. It then passes through the piston shaft wall through the radial opening 92. The flow reverses directions again as it passes between the small annular space between the piston 62 and the fluid baffle 100 until it reaches the double threads and spirals therein through to the end of the baffle 100 where it turns and heads back down through the center of the baffle 100 along the outside of the LVDT 104. The liquid then passes from the piston chamber 34 into passageway 122 and the control routing 126 to the servo valve 16. Flow continues through the servo valve 16 to the return routing 148 (shown in FIG. 4) and exits the valve through the return port 28 where it is carried via a separate return line back to the liquid storage tank.

When the nozzle is to be closed or throttled, the servo valve 16 opens its supply side port 146 and closes its return side port 150. The piston/pintle assembly is driven axially toward from the nozzle (right in the drawings) by the pressurized fluid taking the path shown in FIGS. 7 and 8. Specifically, since port 146 is open, flow passes through the supply routing 136 and through the servo valve 16 (see FIG. 7) in parallel with flow into the piston chamber 34. Following the arrows of FIG. 8, like before, the liquid again flows from the annular channel 48 along the outside of the piston guide 38 to the cool side face of the shaft seal (94 and 96). The fluid flows along the face of the shaft seal and back through the small annular space between the piston 62 and the piston guide 38 where it passes through the piston shaft wall through the radial opening 92. The flow reverses directions again as it passes between the small annular space between the piston 62 and the fluid baffle 100 until it reaches the double threads and spirals therein through to the end of the baffle 100 where it turns and heads back down through the center of the baffle 100 along the outside of the LVDT 104. Because port 150 is closed, the control routing 126 and passageway 122 backs up so that fluid flows in the opposite direction (downstream toward the piston 62). This causes the liquid passing out of the fluid baffle 100 to converge with the backflow and apply a force on the front face of the piston head 40 to drive the piston 62 toward the nozzle. Force on the piston 62 is thus maximized in the close direction by virtue of the flow being blocked from the return pressure in this direction. This slows cooling of the valve temporarily in this direction, but promotes a tight metal to-metal seal of the pintle 64 with the nozzle module when fully closed (and thus low leakage).

The configuration of the valve provides several heat dissipating features that are critical to the proper performance of the valve, particularly in the extreme pressure and temperature conditions present in the scramjet engine environment. First, the piston guide, piston and fluid baffle define a serpentine passageway for the (relatively cool) liquid fuel which directs the liquid fuel along the inner and outer surfaces of the piston (as well as the piston guide and the outside of the LVDT). Heat conducted through the shaft of the piston from the pintle and its tail end is transferred to the liquid fuel. Second, the shaft seal and high temperature (and low conduction) washer provide a physical and thermal barrier between the hot gaseous side of the valve and the liquid fuel side of the valve. The routing of the liquid fuel through the piston chamber ensures that liquid fuel flows along the entire cool side face of the shaft seal, picking up and carrying away heat therefrom. This is very important given the extreme temperature gradient between the two areas of the valve. Third, the piston guide is located upstream from the shaft seal so that it is thermally insulated from the hot gas and thus less susceptible to thermal distortion that could impede sliding of the piston. Fourth, the thinned section of the piston shaft downstream from the shaft seal reduces the conductive surface area of the piston and also provides a location for any thermal distortion that might occur in the piston due to the extreme temperature of the gas. Finally, and possibly most importantly, the double spiral flow path between the piston and baffle creates the necessary flow velocity and bulk fluid movement to transfer the required amount of heat from the piston.

Figure 12:
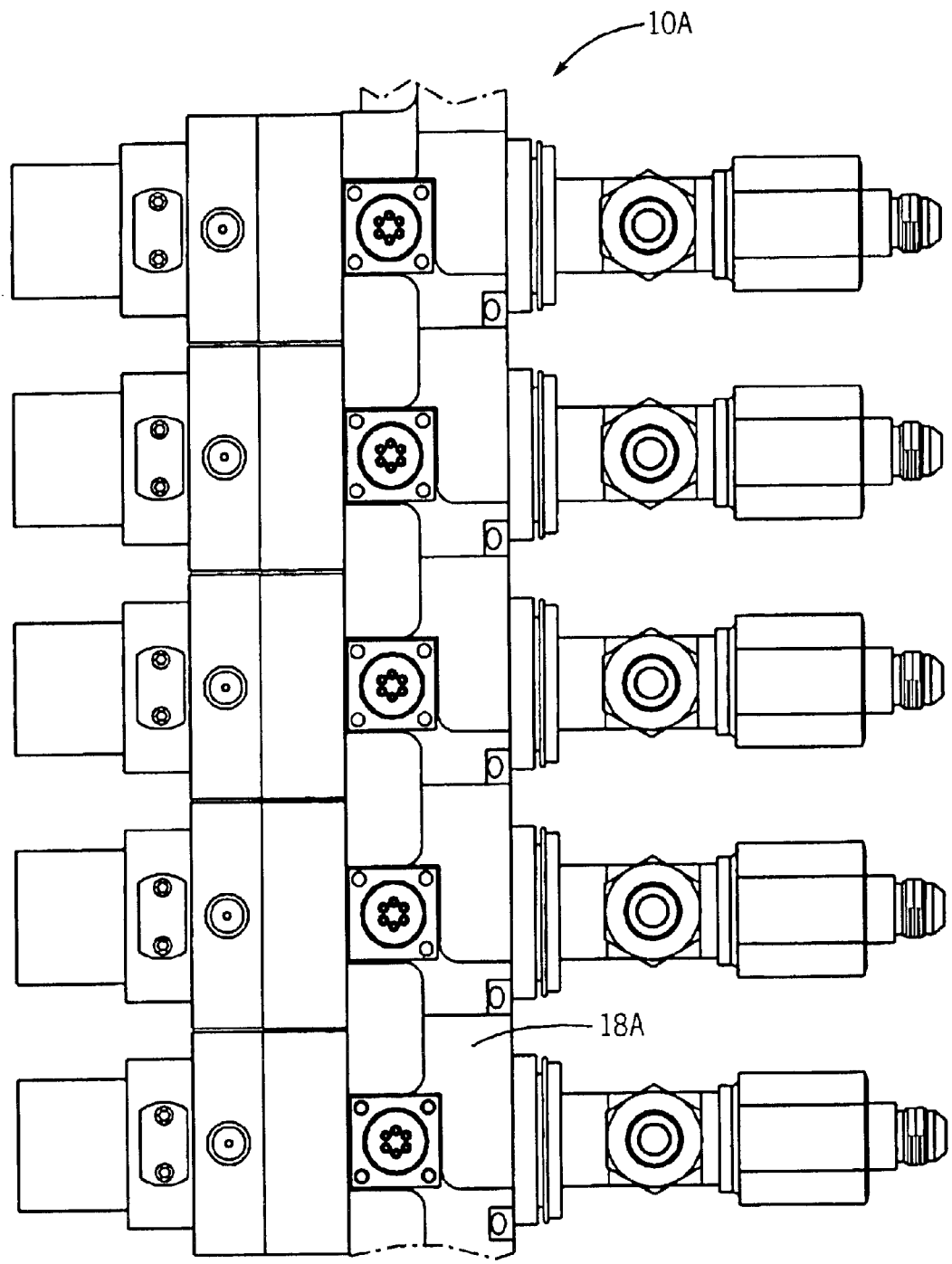
FIG. 12 is a top view of a preferred five unit valve array for a scramjet engine application.

As shown in FIG. 12, a preferred version of the valve for metering fuel to the multiple combustion zones of a scramjet engine, the valve is a valve array 10A. The valve array is identical to that described above except it has a main housing 18A defining a 5-part manifold, in effect creating a single unit with five valves with their own piston chambers to which pluralities of the other above described components are assembled. The manifold provides internal routing linking the supply ports for each piston chamber in parallel so that only one supply line and one return line is necessary.

It should be appreciated that preferred embodiments of the invention have been described above. However, many modifications and variations to these preferred embodiments will be apparent to those skilled in the art, which will be within the spirit and scope of the invention. Moreover, the described scramjet engine application is only one of the many uses for the valve of the present invention; it is also possible for the valve construction described herein to be used to meter liquid media and to be driven by pressurized liquid other than fuel. Therefore, the invention should not be limited to the described embodiment. To ascertain the full scope of the invention, the following claims should be referenced.

I claim:

1. A valve actuated by a pressurized drive media for metering a primary media, the valve comprising:
   a body defining a piston chamber and having a nozzle passageway axially aligned with the piston chamber about a stroke axis, the body having drive media supply and return ports in communication with the piston chamber and primary media intake and exhaust ports in communication with the nozzle passageway, the piston chamber and supply and return ports being isolated from the nozzle passageway and intake and exhaust ports;
   a pintle extending along the stroke axis has a head sized to close off the nozzle passageway;
   a piston disposed in the piston chamber along the stroke axis, the piston being coupled to the pintle and having a head responsive to the drive media when pressurized to drive the pintle between an open position in which the primary media intake and exhaust ports are in communication with each other and a closed position in which the pintle head closes off the nozzle passageway such that the intake and exhaust ports are not in communication with each other; and
   a baffle disposed within the piston chamber so as to direct the drive media in a path adjacent the piston.

2. The valve of claim 1, wherein the primary media is at a higher temperature than the drive media.

3. The valve of claim 2, wherein the drive media is liquid and the primary media is gaseous.

4. The valve of claim 3, wherein the drive media is liquid jet engine fuel.

5. The valve of claim 1, wherein the piston defines a radial passageway leading to an axial cavity open at the head so that drive media can pass through the piston.

6. The valve of claim 5, wherein the baffle has a hollow core and an open end, the baffle being disposed in the piston cavity such that drive media can pass through the radial passageway, between the piston and the baffle and exit the piston through the opening in the piston head.

7. The valve of claim 6, wherein baffle has an external threaded section contacting the piston cavity wall through which the drive media passes.

8. The valve of claim 7, wherein the threaded section defines two helical flow paths.

9. The valve of claim 6, further including a piston guide fixedly disposed about the stroke axis, the piston guide defining an inner diameter against which the piston head slideably seals and an outer annular channel sealed against the piston chamber at one axial end and defining an passageway at an opposite end for drive media to pass to the piston.

10. The valve of claim 9, further comprising a seal separating the drive media from the primary media disposed downstream from the piston guide.

11. The valve of claim 6, further including a position transducer disposed along the stroke axis, the position transducer including a sensing coil fixed with respect to the body and a metallic probe coupled to the piston and movable with respect to the coil within a center of the coil.

12. The valve of claim 11, wherein the position transducer is a linear variable differential transformer.

13. The valve of claim 1, further including a servo valve for controlling flow through the drive media supply and return ports.

14. The valve of claim 1, further including a servo valve and an electronic control unit providing an input signal to the servo valve for controlling flow through the drive media supply and return ports.

15. The valve of claim 14, further including a position transducer disposed along the stroke axis, the position transducer including a sensing coil fixed with respect to the body and a metallic probe coupled to the piston and movable with respect to the coil within a center of the coil.

16. The valve of claim 15, wherein the position transducer provides a feedback signal to the control unit corresponding to the position of the piston for adjusting the input signal supplied to the servo valve in response to the feedback signal.

17. The valve of claim 1, wherein the nozzle passageway is a venturi passageway having a narrowed throat that can be sealed by the pintle head.

18. The valve of claim 1, wherein the body is defined by a main housing and a removable nozzle body.

19. The valve of claim 18, wherein the nozzle body is secured to the main housing by a threaded collar.

20. The valve of claim 18, wherein the nozzle passageway is an insert module disposed at one end of the nozzle body.

21. The valve of claim 1, further comprising a seal separating the drive media from the primary media disposed downstream from the piston guide.

22. A pressurized liquid driven valve for metering fuel, the valve comprising:
   a valve body at least in part defining a piston chamber disposed about a stroke axis and having supply and return ports for passing pressurized liquid through the piston chamber;
   a nozzle body extending from the valve body along the stroke axis in axial alignment with the piston chamber and having intake and exhaust ports for passing fuel through a throat of a venturi passageway;
   a pintle extending along the stroke axis and having a head sized to close off the throat of the venturi passageway;

a piston axially disposed in the piston chamber along the stroke axis, the piston being coupled to the pintle and having a head responsive to the pressurized liquid to drive the pintle along the stroke axis between an open position in which the fuel can pass through the venturi passageway and a closed position in which the pintle head closes off the venturi passageway;

a baffle disposed within the piston chamber so as to direct the pressurized liquid in a path adjacent the piston;

a seal separating at least a portion of the piston chamber and the supply and return ports from the venturi passageway and the intake and exhaust ports; and a servo valve in communication with the supply and return ports for controlling flow of the pressurized liquid through the piston chamber and thereby control translation direction and speed of the piston.

23. The valve of claim 1, wherein the pressurized liquid is liquid fuel and the fuel is a gaseous fuel at a temperature at least twice that of the liquid fuel.

24. A fueldraulic valve array for metering gaseous fuel, the valve array comprising:

a valve body manifold at least in part defining a plurality of piston chambers disposed about parallel stroke axes, the manifold having supply and return ports for passing pressurized liquid fuel through the piston chambers;

a plurality of nozzle bodies connected to the manifold and extending along the stroke axes in axial alignment with the piston chambers, the nozzle bodies each having intake and exhaust ports for passing gaseous fuel through a throat of a venturi passageway;

a plurality of pintles extending along the stroke axes and having heads sized to close off the throats of the venturi passageways;

a plurality of pistons axially disposed in the piston chambers along the stroke axes, the pistons being coupled to the corresponding pintles and having heads responsive to the pressurized liquid fuel to drive the pintles along the stroke axes between open positions in which the gaseous fuel can pass through the venturi passageways and closed positions in which the pintle heads close off the venturi passageways;

a plurality of baffles disposed within respective piston chambers so as to direct the pressurized liquid fuel in a spiral path adjacent the pistons;

a plurality of seals in the piston chambers separating at least a portion of the piston chamber and the supply and return ports from the venturi passageway and the intake and exhaust ports; and a plurality of servo valves in communication with the supply and return ports for controlling flow of the pressurized liquid fuel through the piston chambers and thereby control translation direction and speed of the pistons.

* * * * *